United States Patent
Radhakrishnan

(10) Patent No.: US 10,229,194 B2
(45) Date of Patent: *Mar. 12, 2019

(54) PROVIDING KNOWN DISTRIBUTION PATTERNS ASSOCIATED WITH SPECIFIC MEASURES AND METRICS

(71) Applicant: INTERNATIONAL BUSINESS MACHINES CORPORATION, Armonk, NY (US)

(72) Inventor: Rajesh Radhakrishnan, Reston, VA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/798,561

(22) Filed: Oct. 31, 2017

(65) Prior Publication Data

US 2018/0068017 A1 Mar. 8, 2018

Related U.S. Application Data

(63) Continuation of application No. 15/364,446, filed on Nov. 30, 2016, now Pat. No. 9,881,078, which is a continuation of application No. 13/920,109, filed on Jun. 18, 2013, now Pat. No. 9,563,603.

(51) Int. Cl.
  *G06F 17/30* (2006.01)
  *G06F 17/18* (2006.01)
  *G06F 17/27* (2006.01)

(52) U.S. Cl.
  CPC ........ *G06F 17/30705* (2013.01); *G06F 17/18* (2013.01); *G06F 17/2785* (2013.01); *G06F 17/30011* (2013.01); *G06F 17/30675* (2013.01)

(58) Field of Classification Search
  None
  See application file for complete search history.

(56) References Cited

U.S. PATENT DOCUMENTS

| | | |
|---|---|---|
| 8,276,207 B2 | 9/2012 | Walsh et al. |
| 9,563,603 B2 | 2/2017 | Radhakrishnan |
| 2003/0212658 A1 | 11/2003 | Ekhaus |

(Continued)

FOREIGN PATENT DOCUMENTS

EP   1927921   6/2008

OTHER PUBLICATIONS

Kankanhalli et al., "Knowledge Management Metrics: A Review and Directions for Future Research", National University of Singapore, atreyi@comp.nus.edu.sg, 17 pages.

(Continued)

*Primary Examiner* — Anhtai V Tran
(74) *Attorney, Agent, or Firm* — Christopher K. McLane; Andrew M. Calderon; Roberts Mlotkowski Safran Cole & Calderon, P.C.

(57) ABSTRACT

A computer receives one or more keywords input by a user to describe a metric or a test and identifies a first document that includes at least one of the keywords. The computer identifies, in the first document, a known distribution pattern and an associated metric or measure that relate to the one or more keywords. The computer makes an electronic record of the identified known distribution pattern and associated metric or measure.

11 Claims, 3 Drawing Sheets

(56) References Cited

U.S. PATENT DOCUMENTS

| | | |
|---|---|---|
| 2009/0144279 A1 | 6/2009 | Moe |
| 2009/0313237 A1 | 12/2009 | Agrawal et al. |
| 2012/0291137 A1 | 11/2012 | Walsh et al. |
| 2013/0262477 A1* | 10/2013 | Monaco ............ G06F 17/30684 707/748 |
| 2013/0308867 A1 | 11/2013 | Baba et al. |
| 2014/0101173 A1 | 4/2014 | Moon et al. |

OTHER PUBLICATIONS

Neumayer et al., "Ranking Distributed Knowledge Respositories", Norwegian University of Science and Technology, Department of Computer and Information Science, Trondheim, Norway, 6 pages.

* cited by examiner

PROVIDING KNOWN DISTRIBUTION PATTERNS ASSOCIATED WITH SPECIFIC MEASURES AND METRICS

FIELD OF INVENTION

The present invention relates generally to statistical analysis, and more specifically to identifying a valid distribution pattern for results of a type of test.

BACKGROUND OF THE INVENTION

Different subject matter for a wide range of topics are analyzed and measured using various empirical studies and experimental tests that produce test results, which form distribution patterns when combined with the scales, metrics, and measures that were used. There are many well-known discrete distribution patterns such as Weibull, Bernoulli, binomial, negative binomial, Poisson and geometric distributions. There are many well-known continuous distributions such as uniform, normal, exponential, gamma and beta distributions.

A distribution pattern for an object is created by graphing variations in a characteristic of the object. For example, an x-axis can represent the mass of each object, and a y-axis can represent the number of the objects with a given mass. Statistically, the resulting distribution pattern for the object is typically a bell curve where the objects with the most common mass peak at the top of the bell.

Various types of scales are used to measure subject matter, including nominal, ordinal, interval and ratio scales. Scales, such as a numerical scale which simply counts objects, a scale such as meters to measure distance, a scale such as seconds to measure time, a scale such as bit rate to measure data transmission, a scale such as the Richter scale to measure earthquakes, etc. Metrics are measures of key attributes that often yield information about observed phenomena. Metrics provide a basis for empirical validation of theories and relationships between concepts. There are different metrics for different subjects that are meaningful and widely accepted, such as gas-mileage for an automobile or bit rate for a network, and should be re-used for subsequent analysis and comparison of objects within these subjects.

Statistics is the study of the collection, organization, analysis, interpretation, and presentation of data. The mathematical functions used in statistics provide a means to analyze data and add meaning to the measurements. Statistics can also be used for the planning of data collection in terms of the design of surveys and experiments. Statisticians can improve data quality by developing specific experiment designs and survey samples. Statistics itself also provides tools for prediction and forecasting the use of data and statistical models.

In addition, data patterns may be modeled in a way that account for randomness and uncertainty in the observations. These models can be used to draw inferences about the process or population under study; a practice called inferential statistics. Inference is a vital element of scientific advance, since it provides a way to draw conclusions from data that are subject to random variation. To prove the propositions being investigated further, the conclusions are tested as well, as part of the scientific method. Descriptive statistics and analysis of the new data tend to provide more information as to the truth of the proposition. Statistics is closely related to probability theory, with which it is often grouped. The difference is, roughly, that probability theory starts from the given parameters of a total population to deduce probabilities that pertain to samples. Statistical inference, however, moves in the opposite direction by inductively inferring from samples to the parameters of a larger or total population.

Probability theory is the branch of mathematics concerned with probability, the analysis of seemingly random phenomena. The central objects of probability theory are random variables, stochastic processes, and events: mathematical abstractions of non-deterministic events or measured quantities that may either be single occurrences or evolve over time in an apparently random fashion.

The application of probability and statistics to analyze a data set can provide valuable insight into observed phenomena. Knowledge of which approach to use when gathering data, which mathematical function to apply to the data set, or which distribution pattern best encompasses the data is not always clear. Known solutions to this problem require in-depth knowledge by an individual, who can then make a determination as to which approach, mathematical function, or distribution pattern to use. However, there are currently a large number of possible approaches, mathematical functions, and distribution patterns to choose from and the number of options are continually increasing. As such, the detailed knowledge required to identify an appropriate measure, metric, or distribution pattern for a given type of test or type of data is also increasing. If a person knows what type of distribution pattern to expect for test results, the person will know if test results obtained by the person are reasonable and indicate that the test conducted by the person was valid.

An object of the invention is to assist a person in determining a distribution pattern to expect for a test or metric.

SUMMARY

Embodiments of the present invention provide a system, method, and program product for determining accepted distribution patterns for a given metric or measure. A computer receives one or more keywords input by a user to describe the metric, or the test. The computer identifies a first document that includes at least one of the one or more keywords. The computer identifies a first distribution pattern specified in the first document for the metric or the test. The computer makes an electronic record that the first distribution pattern has previously been exhibited for the metric or results of the test.

DETAILED DESCRIPTION

Embodiments of the present invention will now be described in detail with reference to the accompanying drawings.

Figure 1:
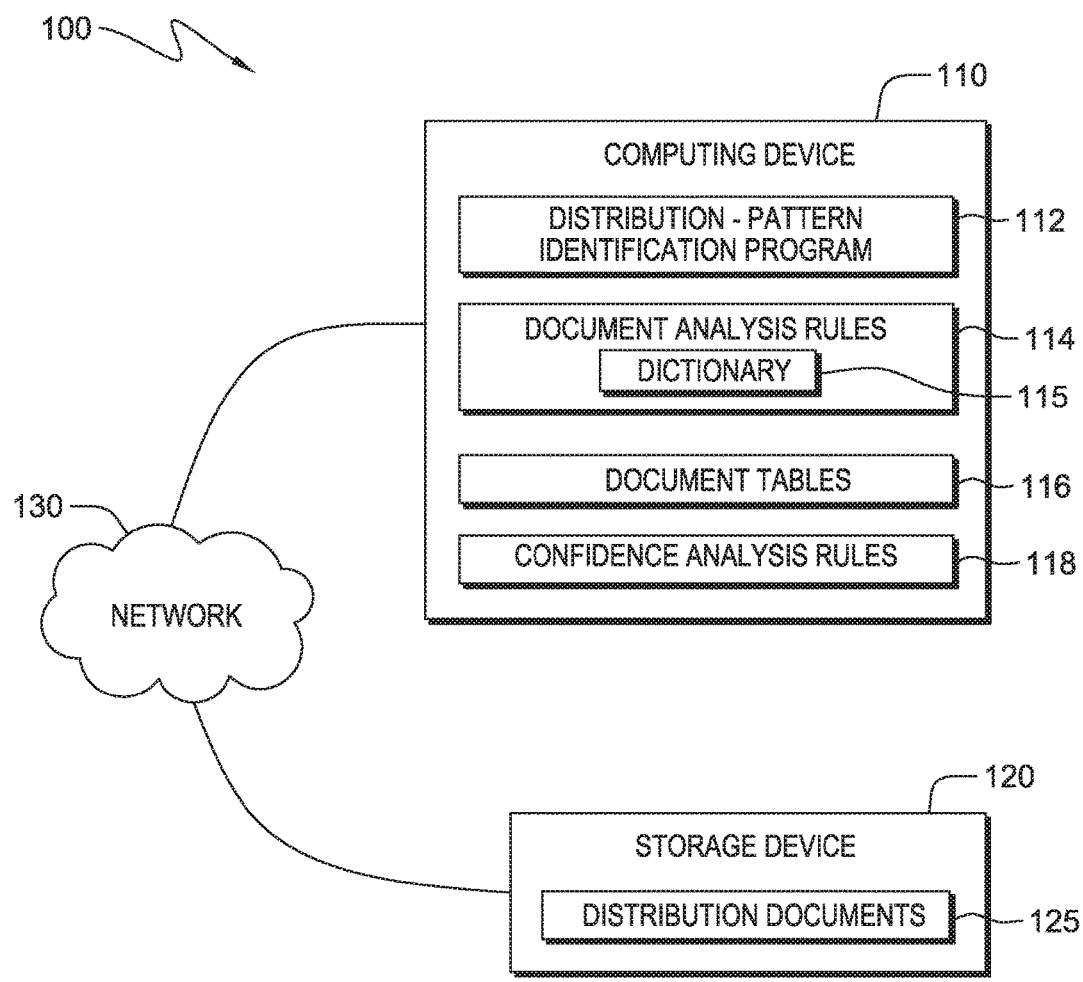
FIG. 1 is a block diagram of a computer system for identifying an expected distribution pattern for a type of test, in accordance with an embodiment of the present invention.

FIG. 1 is a block diagram illustrating system 100 in accordance with one embodiment of the present invention. System 100 includes computing device 110. Distribution-pattern identification program 112 is installed in computing device 110. Document analysis rules 114, document tables 116, and confidence analysis rules 118 are stored in computing device 110 or associated storage. Storage device 120 includes distribution documents 125. As explained in more detail below, distribution-pattern identification program 112 searches the distribution documents to identify one or more documents which match search criteria for a test of a user and contain test results that exhibit expected distribution patterns for the type of test.

In other embodiments, distribution documents 125, distribution-pattern identification program 112, document analysis rules 114, document tables 116, and confidence analysis rules 118 may be stored externally and accessed through network 130. Network 130 may be, for example, a local area network (LAN), a wide area network (WAN) such as the Internet, or a combination of the two, and may include wired, wireless, fiber optic or any other connection known in the art. In general, network 130 may be any combination of connections and protocols that will support communications between storage device 120, distribution documents 125, distribution-pattern identification program 112, document analysis rules 114, document tables 116, and confidence analysis rules 118, and computing device 110 in accordance with a desired embodiment of the present invention.

Figure 3:
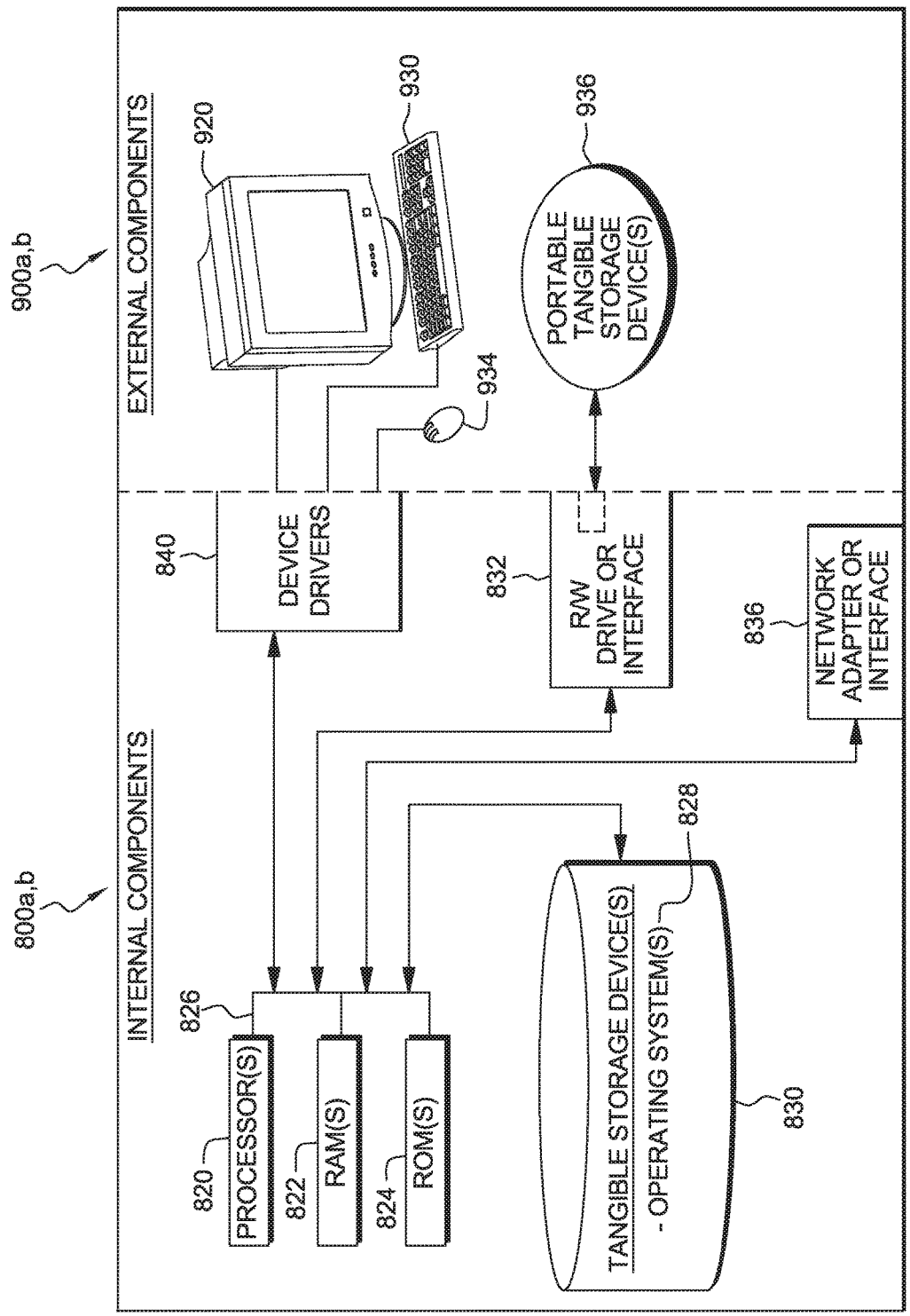
FIG. 3 is a block diagram of internal and external components within the computing device of FIG. 1 in accordance with an embodiment of the present invention.

Computing device 110 and storage device 120 may include internal hardware components 800 and external hardware components 900 as depicted and described in further detail with respect to FIG. 3.

In an exemplary embodiment, distribution-pattern identification program 112 receives keyword(s) from a user to identify the type of test (such as a measurement of a key metric) conducted or to be conducted by the user. The keyword(s) can indicate a subject area, a type of attribute measured, a type of test, a type of data produced by a test, a type of metric, a type of measurement used, a distribution pattern, or any combination thereof. For example, if the user plans to test utilization of memory in a computer, the key words can be "memory", "utilization" and "distribution". Distribution-pattern identification program 112 uses the key words to search for documents that include the keyword(s). Next, distribution-pattern identification program 112 determines which of the documents specify a distribution pattern by searching the documents for any of a predetermined list of known distribution patterns? Next, distribution-pattern identification program 112 determines a confidence levels for each of the distribution patterns identified in the search results. In the preferred embodiment of the present invention, the confidence level is based on the number of documents which correspond to the key word search and exhibit the same distribution pattern. Then, computing device 110 displays the identified documents, the identified distribution patterns, and the determined confidence levels.

In an exemplary embodiment, document analysis rules 114 include text and semantic analysis rules. These rules are applied to analyze the documents that are identified during searches, which are performed by distribution-pattern identification program 112 using the keyword(s). In this embodiment, document analysis rules 114 also includes a dictionary of keyword(s), herein denoted dictionary 115, that are used in conjunction with the text and semantic analysis rules during the analysis of documents. This dictionary provides synonyms (often highly technical and esoteric) for user-specified search terms, and distribution-pattern identification program 112 supplies the synonyms as well as the user-specified search terms for the key word search to a search engine which executes searches for the documents included in document tables 116. Typically, dictionary 115 includes keyword(s) that correspond to subject areas, types of attributes measured, types of tests, types of data produced by tests, types of metrics, type of measures, and various known distribution patterns. The rules included in document analysis rules 114 convert the text of documents into data for analysis, via application of natural language processing (NLP). NLP includes topics such as word and sentence tokenization, text classification, sentiment analysis, spelling correction, information extraction, parsing, meaning extraction, and question answering. However, in this embodiment, it is to be noted that through the application of NLP the meaning of text can be identified and relevant information extracted from the various analyzed documents. Document analysis rules 114 also include analytical rules to populate a database and an index, included in document tables 116, with the keywords that are identified via the document analysis.

The database, included in document tables 116, includes tables that organize documents based on the results of text and semantic analysis, i.e. based on the inclusion of keyword(s). The documents are organized by at least one of subject area, type of attribute measured, type of test, type of data produced by a test, type of metric, the type of measure used, distribution pattern, and determined confidence level. In other words, the fields in the table associated with a given document are populated based on the keyword(s) included in that document.

Distribution-pattern identification program 112 searches the index of the database, included in document tables 116, for matches to the keyword(s) provided by the user. If there are no identified results or if the results have a low confidence level, then distribution-pattern identification program 112 searches distribution documents 125 for previously unidentified documents that include the keyword(s). The newly identified documents, included in distribution documents 125, are then analyzed using dictionary 115 and the text and semantic analysis rules of document analysis rules 114. The analyzed documents are then included as part of document tables 116.

In an exemplary embodiment, confidence analysis rules 118 are used by distribution-pattern identification program 112 to determine confidence levels for the distribution patterns identified in documents. These rules can be very simple. For example, if 300 papers use a given metric and a Weibull distribution pattern, then the Weibull distribution pattern would have a proportionately high confidence level associated with that metric. In such a scenario, the document, metric, Weibull distribution pattern, and associated confidence level are included as part of document tables 116. Thus, a search, by distribution-pattern identification program 112, for the metric would generate a result that includes the Weibull distribution pattern and the high confidence level.

In an exemplary embodiment, distribution documents 125 includes documents such as research papers, peer reviewed journal articles, as well as publications that include a variety of metrics and distribution patterns. Most of these documents also include various keyword(s) included in dictionary 115. As described above, if distribution-pattern identification program 112 searches distribution documents 125 and identifies a document containing a keyword of a search, then that document is retrieved and analyzed before being added to document tables 116.

Figure 2:
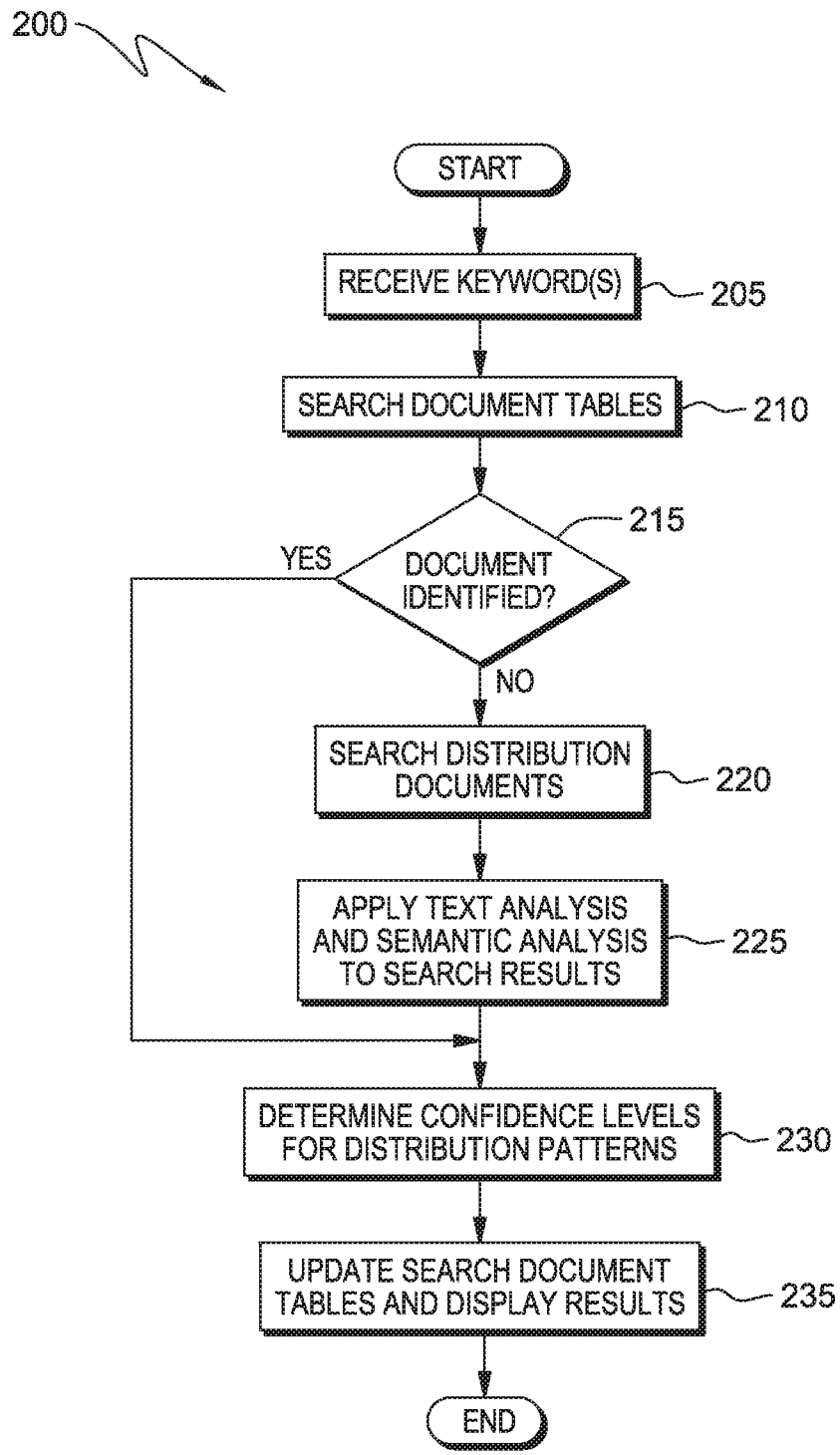
FIG. 2 is a flowchart illustrating the steps of a distribution-pattern identification program of FIG. 1, in accordance with an embodiment of the present invention.

FIG. 2 is a flowchart illustrating the function of distribution-pattern identification program 112, executing on computing device 110, for determining accepted distribution patterns for a result of a test, in an exemplary embodiment.

In this exemplary embodiment, in step 205, distribution-pattern identification program 112 receives a list of keyword(s) from a user. Distribution-pattern identification program 112 then searches the tables included in document tables 116 for documents that include instances of the keyword(s) and its synonyms as found in dictionary 115, in step 210.

In decision step 215, distribution-pattern identification program 112 determines if any documents are identified, i.e., if any documents contain the keyword(s) or their synonyms. If documents are identified (decision step 215, yes branch), then distribution-pattern identification program 112 proceeds to step 230 to determine the confidence levels for distribution patterns included in the identified documents. If no documents are identified (decision step 215, no branch), then distribution-pattern identification program 112 searches distribution documents 125 for previously unidentified documents that contain the keyword(s), in step 220.

In step 225, distribution-pattern identification program 112 accesses dictionary 115 and applies the text analysis rules and semantic analysis rules, included in document rules 114, to any documents that were identified in step 220. The now analyzed documents are included as part of document tables 116.

In step 230, distribution-pattern identification program 112 determines confidence levels for the distribution patterns of the documents that include the keyword(s), which are included in document tables 116. Distribution-pattern identification program 112 determines, i.e., calculates, the respective confidence levels for the distribution patterns using the analysis rules included in confidence analysis rules 118. Distribution-pattern identification program 112 updates the document tables, included in document tables 116, with the calculated confidence levels and displays the results of the search and the determined confidence level(s) to the user, in step 235. For example, the search results include 500 documents that all use a Poisson distribution for a given type of test data. The results of the search would indicate that the Poisson distribution was applied to the type of data, and a high confidence level reflecting its inclusion in the 500 documents.

In some embodiments, the determination of whether any documents were identified during a search is based, in part, on a confidence level threshold. For example, there are five search results that include the keyword(s) and respective confidence levels; all of which are below two. The threshold for acceptable confidence level is three. Therefore, distribution-pattern identification program 112 determines that no documents were identified.

In certain embodiments, distribution-pattern identification program 112 includes a graphical user interface (GUI) that is used to conduct searches and display search results to the user.

In certain embodiments, document analysis rules 114 include rules to identify references to other documents that include the keyword(s). Distribution-pattern identification program 112 uses these identified references to search for and retrieve the referenced documents.

In certain embodiments, distribution-pattern identification program 112 includes programming to analyze documents to identify graphical representations of test results and metrics included in the documents, i.e. distribution-pattern identification program 112 includes image analysis programming to identify known distribution patterns. Distribution-pattern identification program 112 identifies a graphical representation in a document by analyzing the document for graphical data types, e.g., file attachments that end in .gif or areas of the document that include non text information such as axis, lines, values, and data point etc. In such an embodiment, the rules for document analysis to identify graphical representations are included as part of document analysis rules 114. Document analysis rules 114 also include rules and programming to analyze the graphical content of such files. In such an embodiment, dictionary 115 includes a plurality of known distribution patterns and the guidelines that are used to identify each type of distribution pattern, i.e., definitions that are applied to identify known distribution patterns. In such an embodiment, using document analysis rules 114 and dictionary 115, distribution-pattern identification program 112 matches a known type of distribution pattern to the graphical representation displayed in the document based on the shape of the graphical representation, and presents the distribution pattern to the user. For example, if the graphical pattern shown in a graph in the document has the shape of a bell curve, distribution-pattern identification program 112 applies document analysis rules 114 and dictionary 115 and identifies that the graphical pattern has a symmetrical shape with a single apex and two termini that approach zero. Based on the guidelines that are used to identify each type of distribution pattern, included in dictionary 115, distribution-pattern identification program 112 identifies and classifies the graphical pattern as a Gaussian distribution. As another example, distribution-pattern identification program 112 identifies a file attachment that end in .gif. Distribution-pattern identification program 112 opens the file using an appropriate reader and then analyses the resulting graphical pattern, using document analysis rules 114 and dictionary 115, and identifies a matching known distribution pattern.

In certain embodiments, distribution-pattern identification program 112 includes programming to extract and convert parts of electronic documents and file attachments. For example, a document is in portable document format (PDF) and includes an embedded image in a format that can not be analyzed using document analysis rules 114 and dictionary 115. Distribution-pattern identification program 112 extracts the embedded image and converts the image into a .gif format, which can be analyzed using document analysis rules 114 and dictionary 115. Distribution-pattern identification program 112 can thus identify a distribution pattern included in a document even though that document does not include the name of the distribution pattern or keywords that identify that distribution pattern.

Distribution-pattern identification program 112 can also apply text analytics to the contents within such a document and determine a confidence level for that distribution pattern, i.e., a confidence level that indicates how well the given scale or metric follows a certain distribution pattern. This confidence level can be based on such factors as a) number of published documents that establish the relationship between a given scale, metric or measure and a certain distribution pattern, b) the reputation of the journals where these papers were published, c) a characteristic of the journal articles, e.g., length, d) duration or time period associated with these publications that establish the scale-distribution relationship, i.e., the longer the duration the higher the confidence level for the scale-distribution relationship. For example, a document includes data, in a graphical representation, for a population distribution of a species of pink bird in a given area. Distribution-pattern identification program 112 applies graphical analysis programming and identifies the distribution as matching a clumped distribution pattern. Therefore, distribution-pattern identification program 112 adds the document to document tables 116 and associates the entry with the following keywords: clumped distribution pattern, pink bird, and population distribution.

Computing device 110 includes a set of internal components 800a and external components 900a, illustrated in FIG. 3. Storage device 120 includes a set of internal components 800b and external components 900b, illustrated in FIG. 3. Each of the sets of internal components 800a,b includes one or more processors 820, one or more computer-readable RAMs 822 and one or more computer-readable ROMs 824 on one or more buses 826, one or more operating systems 828 and one or more computer-readable tangible storage devices 830. The one or more operating systems 828 and distribution documents 125, distribution-pattern identification program 112, document analysis rules 114, document tables 116, and confidence analysis rules 118 are stored on one or more of the respective computer-readable storage devices 830 for execution by one or more of the respective processors 820 via one or more of the respective RAMs 822 (which typically include cache memory). In the illustrated embodiment, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store but does not transmit a computer program and digital information.

Each set of internal components 800a,b also includes a R/W drive or interface 832 to read from and write to one or more portable computer-readable storage devices 936 that can store but do not transmit a computer program, such as a CD-ROM, DVD, memory stick, magnetic tape, magnetic disk, optical disk or semiconductor storage device. Distribution documents 125, distribution-pattern identification program 112, document analysis rules 114, document tables 116, and confidence analysis rules 118 can be stored on one or more of the respective portable computer-readable storage devices 936, read via the respective R/W drive or interface 832 and loaded into the respective hard drive or semiconductor storage device 830. The term "computer-readable storage device" does not encompass signal propagation media such as copper cables, optical fibers and wireless transmission media.

Each set of internal components 800a,b also includes a network adapter or interface 836 such as a TCP/IP adapter card or wireless communication adapter (such as a 4G wireless communication adapter using OFDMA technology). Distribution documents 125, distribution-pattern identification program 112, document analysis rules 114, document tables 116, and confidence analysis rules 118 can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

Each of the sets of external components 900a,b includes a display screen 920, a keyboard or keypad 930, and a computer mouse or touchpad 934. Each of the sets of internal components 800a,b also includes device drivers 840 to interface to display screen 920 for imaging, to keyboard or keypad 930, to computer mouse or touchpad 940, and/or to a display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java®, C+) including low-level, high-level, object-oriented or non object-oriented languages. Alternatively, the functions of the programs can be implemented in whole or in part by computer circuits and other hardware (not shown).

Based on the foregoing, a computer system, a method, and a program product have been disclosed for determining a distribution pattern previously exhibited for a metric or results of a test. However, numerous modifications and substitutions can be made without deviating from the scope of the present invention. Therefore, the present invention has been disclosed by way of example and not limitation.

What is claimed is:

1. A method for determining a distribution pattern previously exhibited for a metric or a test, the method comprising:
   a computer receiving one or more keywords input by a user to describe the metric, or the test;
   the computer searching a plurality of documents for the one or more keywords;
   the computer identifying a first document that includes at least one of the one or more keywords based on the searching;
   the computer identifying a first distribution pattern specified in the first document for the metric or the test;
   the computer determining confidence level of the first distribution pattern based on the identifying the other documents; and
   the computer outputting information regarding the confidence level.

2. The method of claim 1, wherein the determining the confidence level of the first distribution pattern is further based on a number of the documents that specify the first distribution pattern.

3. The method of claim 1, further comprising the computer making an electronic record that the first distribution pattern has previously been exhibited for the metric or the test.

4. The method of claim 1, wherein the one or more keywords relate to at least one of the metric, a measure, a scale, a measure, a result of the test, a performance indicator, a method of empirical observation or experiment, a type of study, a type of data, a type of test that generated the type of data, a subject that was or will be measured, a category that includes the subject, a scale, a unit of measure, a category that includes the type of test, and a condition that was or will be present during execution of the type of test.

5. The method of claim 1 further comprising the computer searching a knowledge repository for one or more known distribution patterns that are one or both of a) related to the one or more keywords, and b) is a result of an empirical observation or experiment that is identified by the one or more keywords.

6. The method of claim 5, wherein the identified first document is included in the knowledge repository which includes one or more publications and scholarly articles that are accessible via at least one of the Internet or an intranet.

7. The method of claim 5, wherein the first document is included in the knowledge repository which organizes documents based, at least in part, on keywords and known distribution patterns respectively included in those documents.

8. The method of claim 1, further comprising:
the computer identifying a second document that is referenced by the first document, wherein the second document includes a distribution pattern that is related to the one or more keywords; and
the computer identifying and making an electronic record of the known distribution pattern and an associated metric or measure that is included in the second document.

9. The method of claim 8, further comprising:
the computer determining a confidence level for the identified known distribution pattern included in the second document, and
the computer making an electronic record of the determined confidence level for the identified known distribution pattern included in the second document.

10. The method of claim 1, further comprising the computer identifying two or more known distribution patterns that are closely related to one another, wherein the two or more known distribution patterns include at least one element selected from the group consisting of a type of data, a type of test, a category that includes the distribution pattern, a spatial arrangement of data within the distribution pattern, a shape associated with the distribution pattern, and an amount of measured data that is included by the distribution pattern.

11. The method of claim 1, further comprising:
the computer identifying in the first document a graphical representation of the metric or a result of the test; and
the computer identifying a distribution pattern that matches the graphical representation.

\* \* \* \* \*